July 12, 1949.    J. J. KUEHN    2,475,622
INTERMITTENT FILM FEEDING DEVICE
Filed June 14, 1946
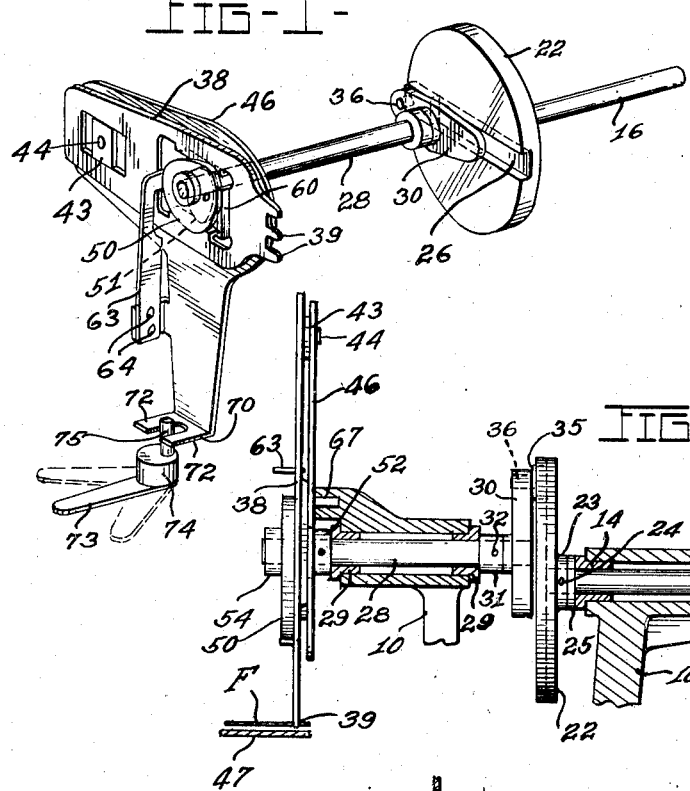
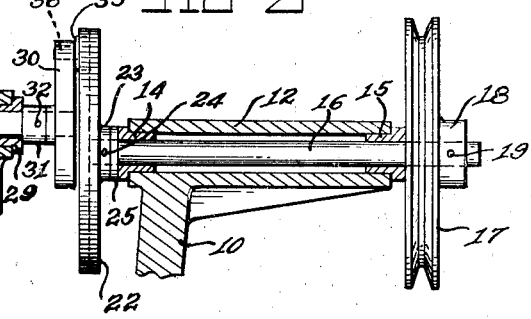
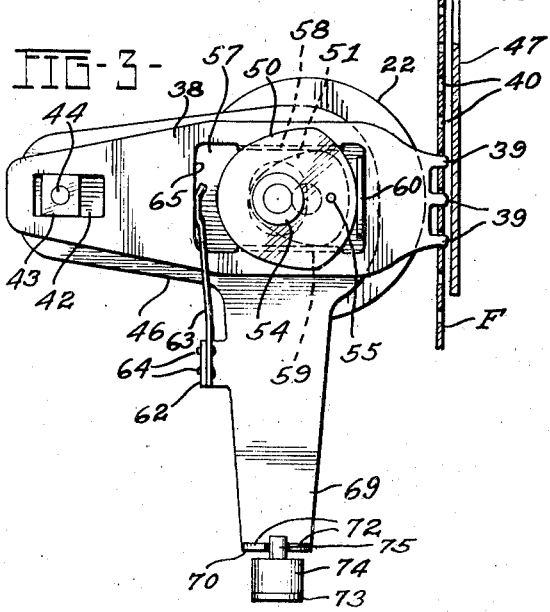
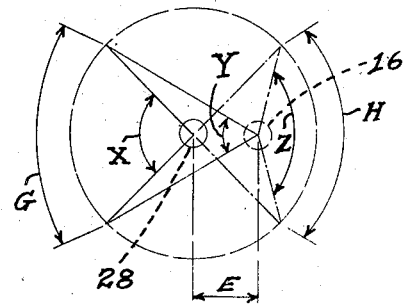
INVENTOR
JOHN J. KUEHN.
BY Joseph B. Lindecke
ATTORNEY.

Patented July 12, 1949

2,475,622

UNITED STATES PATENT OFFICE 2,475,622

INTERMITTENT FILM FEEDING DEVICE

John J. Kuehn, Chicago, Ill., assignor, by mesne assignments, to Illinois Watch Case Co., Elgin, Ill., a corporation of Illinois Application June 14, 1946, Serial No. 676,680

3 Claims. (Cl. 88—18.4)

This invention relates to strip feeding mechanism and more especially to mechanism for intermittently feeding a strip and has particular utility as a film feeding means for a motion picture projector or the like.

The invention embraces the provision of a film or strip feeding means in which a rapid down-pull stroke is employed to advance a film while the return stroke of the film advancing means is accomplished at a comparatively lesser rate of speed.

An object of the invention resides in the provision of a drive mechanism for a film feeding member wherein dual cam means, for obtaining longitudinal reciprocation and vertical oscillation of the member, are mounted upon a single shaft and the latter arranged for rotation at a non-uniform rate for obtaining a comparatively rapid intermittent feed stroke of the film feeding member.

Another object of the invention resides in the provision of a film feed mechanism wherein a rapid film feed down stroke is obtained, said mechanism being arranged whereby vibrations or disturbances of the mechanism are reduced to a frequency very close to the lower threshold of audibility of the human ear.

Still another object is the provision of a drive mechanism of simplified construction for film feeding devices wherein the movement of the components is reduced to a minimum commensurate with the functions performed by said components with a consequent reduction of wear upon the components or parts of the mechanism.

Another object is the provision of means for feeding film through a projector wherein the time required for the intermittent down-pull of consecutive film frames is reduced to a minimum and the usable light efficiency of the projector increased.

Still a further object of the invention resides in a simple yet effective means for adjusting a film framing bracket to achieve correct and proper centering of the consecutive film frames with the aperture-vignette.

Further objects and advantages are within the scope of this invention such as relate to the arrangement, operation and function of the related elements of the structure, to various details of construction and to combination of parts, elements per se, and to economies of manufacture and numerous other features as will be apparent from a consideration of the specification and drawing of a form of the invention which may be preferred, in which:

Figure 1 is an isometric view illustrating the arrangement of components of the strip feeding means of my invention;

Figure 2 is a top plan view showing one embodiment of the strip feeding means;

Figure 3 is a side elevational view showing the elements of the strip feeding means; and Figure 4 is a schematic view illustrating the relationship of the components of the strip feeding means.

While I have illustrated the arrangement of my invention as utilized for intermittently feeding film in a motion picture projector, it is to be understood that I contemplate the incorporation of my invention with any mechanism wherein the same may be found to enhance the utility thereof.

Referring to the drawings in detail, there is illustrated a portion of a frame 10 of a motion picture projector, the latter being provided with the conventional type of illuminating arrangement and film supporting means (not shown). The frame 10 is formed with an elongated hollow boss portion 12 and disposed within the end portions of the boss 12 are bearing members 14 and 15. Journaled for rotation in bearing members 14 and 15 and extending within the hollow boss portion 12 is a drive shaft 16 which carries at its outer end a sheave wheel or pulley 17 formed with a hub portion 18 secured to the drive shaft 16 by means of a pin 19. The pulley 17 is adapted to be driven by means of a flexible belt (not shown) connected with an operating motor or other source of power.

Mounted upon the other end of the drive shaft 16 is a disc or member 22 having a hub portion 23 secured to the shaft by means of a pin 24, a thrust bearing or washer 25 being disposed between bearing member 14 and hub 23. One face of the disc 22 is formed with a diametrically disposed channel or recess 26. Also mounted upon a portion of frame 10 is an auxiliary or driven shaft 28 journaled in suitable bearings 29. Mounted upon the end of the driven shaft 28 adjacent the disc 22 is a yoke 30 having a hub portion 31 secured to shaft 28 by means of a pin 32. Disposed for relative slidable movement in the recess 26 is a rectangular block or crosshead 35 which is formed with a cylindrical tenon 36, the latter extending into an opening in the yoke 30.

Disposed adjacent the extremity of driven shaft 28 is a strip engaging and moving means or shuttle plate 38 which is formed at one end with a plurality of projections 39 forming a claw structure especially configurated for intermittent engagement in perforations 40 formed in the film or strip. The rear portion of the shuttle plate 38 is formed with a rectangular slot or aperture 42 within which is slidably disposed a block or crosshead 43, the aperture being of a lengthwise dimension to accommodate longitudinal reciprocations of the shuttle plate 38. The crosshead 43 is formed with a central cylindrical opening adapted to receive a journal pin 44, the latter being fixed in the rear portion of a frame bracket or member 46. Disposed adjacent the film or strip F, as shown in Figure 3, is a film guiding pad or plate 47 formed with an aperture-vignette 48 which defines each individual film frame for projection of the image therethrough. A suitable illuminating means (not shown) is arranged to project a concentrated light beam through the film and frame aperture 48.

Mounted upon the end of driven shaft 28 are cams 50 and 51. Also carried upon the shaft 28 adjacent the innermost cam 51 is a collar 52 fixed upon the shaft and which positions the cam 51 longitudinally of the driven shaft. The extremity of driven shaft 28 is threaded to receive a securing nut 54 which serves to retain cams 50 and 51 upon the shaft. Each of the cams is provided with an opening through which extends a pin or dowel 55 which prevents relative movement occurring between the cams and maintain the proper relationship therebetween.

The shuttle plate 38 is formed with a rectangular opening 57, the upper and lower edges of the opening being bounded or defined by means of ledges or cam engaging surfaces 58 and 59. The innermost cam 51 is disposed between the ledges 58 and 59, as shown in dotted lines in Figure 3. Thus when shaft 28 is rotated, the surface of cam 51 is configurated to cause the shuttle plate 38 to oscillate about the axis of the journal pin 44 to thereby cause reciprocation of claw portions or projections 39.

The shuttle plate 38 is formed with a third ledge 60 defining the forward extent of the aperture 57, cam 50 being arranged to engage the inner surface of ledge 60. Cam 50 is contoured to cause intermittent longitudinal movement of the shuttle plate 38 for the purposes of engaging and disengaging the projections 39 with the film or strip. The framing bracket 46 is formed with a projection 62 to which is fixedly secured a plate spring 63 by means of rivets 64. The free end of the spring 63 is arranged to engage the rear bounding edge wall 65 of opening 57 formed in the shuttle plate 38 and serves to exert rearwardly directed resilient pressure on the shuttle plate for the purpose of maintaining the ledge 60 thereof in constant engagement or contact with the cam 50. The cam 50 is arranged with respect to cam 51 and is contoured so as to move the shuttle plate 38 forwardly to bring the claw formation 39 into engagement with the perforations in the strip or film prior to the down-pull or film advancing stroke of the cam 51. After the down-pull stroke is completed by means of cam 51, the cam 50 is configurated to permit the shuttle plate 38 to be withdrawn from engagement with the film F under the influence of plate spring 63.

The framing bracket 46 is pivoted upon a pin 67 carried by frame 10 of the projector, the pin 67 being arranged near the shaft 28 as shown in Figure 2. The bracket 46 is formed with a depending portion 69, the latter terminating in a projecting portion 70 which is slotted as shown in Figure 1 to form furcations 72. Disposed beneath the portion 70 is an arm 73 secured to a cylindrical hub portion 74 and projecting upwardly therefrom and eccentrically disposed is a tenon or pin 75 extending between the furcations 72. The arm 73 is supported upon the projector frame (in a manner not shown) whereby movement of arm 73 to the dotted line positions illustrated in Figure 1 shifts or adjusts the relative position of the framing bracket 46 about its pivotal center provided by the pin 67. By this means, a shift in the position of the frame bracket 46 changes the relative position of the journal pin 44 and hence modifies the relative position of the shuttle plate 38. By this adjustment the claws 39 are shifted to permit accurate and correct framing of consecutive film frames adjacent the aperture 48 in the pad or plate 47.

Figure 4 illustrates diagrammatically the relative differential in speed between the down-pull stroke of the film engaging shuttle plate 38 during a film advancing period, and a comparatively slow return of the shuttle plate to its initial position to complete a cycle. The letter E represents the amount or dimension that the axes of shafts 16 and 28 are out of alignment. The arc G represents the cycle of down-pull of the shuttle plate 38 in advancing the film which is equivalent to a 90 degree angle of rotation of the auxiliary or intermittent shaft 28. I have found that this angle is approximately the smallest angle over which the down-pull of a film frame can be achieved through the use of a so-called constant diameter cam of the character of the cam 51. This is accomplished, however, with a comparatively small angle of rotation of the drive shaft which is indicated by the arc Y, the angle being approximately 55 degrees. The values of angles are dependent, however, on the amount of misalignment of auxiliary shaft 28 with respect to the drive shaft 16 indicated at E. The arc H represents the return stroke of the shuttle plate and occurs through an angular rotation of driven shaft 16 indicated by the angle Z, which as shown in Figure 4 is an obtuse angle, much greater than angle Y, the latter representing the angle of rotation of shaft 16 corresponding to a film advancing stroke of the shuttle plate 38. By this arrangement the down-pull stroke or film advancing period of shuttle 38 takes place during rotation of the driven shaft 16 through the angularity of angle Y, thus imparting a very rapid down-pull to the film in shifting consecutive frames thereof into registration with the aperture-vignette 48. The angle Z represents the angular rotation of the drive shaft 16 during the return stroke of the shuttle plate 38 to its initial position, which action takes place at a much lesser speed as compared with the down-pull stroke as indicated by the difference between angles Y and Z.

By means of this arrangement the shifting of film or strip takes place in a comparatively short space of time, thus providing a longer dwell for the film frames brought into consecutive registration with the aperture 48 and hence effectively utilizing more of the light output of the projector. The arrangement of my invention is superior to the so-called film feeding devices of the "single skip stroke" type or those types wherein an operative down-pull stroke is followed by one or more idle strokes of the mechanism.

My arrangement minimizes the wear of the parts by reason of lesser movement of the moving elements and the noise of the mechanism is reduced to the lower threshold of audibility of the human ear. This result is attained because at average film speeds, changes in direction of the film feed components set up vibrations occurring at the rate of about 24 vibrations or disturbances per second while in the average "skip stroke" film feed mechanism, the vibrations may be much higher approximating 96 vibrations or disturbances per second. As 20 vibrations per second is approximately the lower limit of human audibility, it will be apparent that the noise level is reduced to a minimum.

It is apparent that, within the scope of the invention modifications and different arrangements may be made other than is herein disclosed, and the present disclosure is illustrative merely, the invention comprehending all variations thereof.

What I claim is:

1. A film feeding mechanism for a motion picture machine having a frame, a film advancing shuttle member pivotally and slidably mounted thereon, a film movable past the frame and means for moving said member to advance the film; means for adjusting the position of said member with respect to said film comprising: a bell crank pivotally mounted on said frame; means on said bell crank to cause pivotal movement of said member; and means associated with said bell crank to cause pivotal movement of said bell crank.

2. A film feeding mechanism for a motion picture machine having a frame, a film advancing shuttle member having a rectangular slot and a block slidable therein, a film movable past said frame and means for moving said member to advance the film; means for adjusting the position of said member with respect to said film comprising: a bell crank pivotally mounted on said frame; means adjacent one end of said bell crank for pivotally supporting said block; and means associated with the other end of said bell crank to cause it to move on its pivot.

3. The device claimed in claim 1 wherein means are provided on said bell crank to cause sliding movement of said member in one direction.

JOHN J. KUEHN.

REFERENCES CITED

The following references are of record in the file of this patent:

UNITED STATES PATENTS

| Number | Name | Date |
| --- | --- | --- |
| 1,227,887 | Connor et al. | May 29, 1917 |
| 1,982,921 | Merta | Dec. 4, 1934 |
| 2,046,572 | Merta | July 7, 1936 |
| 2,168,771 | Howell | Aug. 8, 1939 |
| 2,233,839 | Heurtier | Mar. 4, 1941 |
| 2,281,726 | Stechbart | May 5, 1942 |
| 2,335,435 | Morgan et al. | Nov. 30, 1943 |

FOREIGN PATENTS

| Number | Country | Date |
| --- | --- | --- |
| 12,072 | Great Britain | May 23, 1906 |